(12) United States Patent
Paul

(10) Patent No.: US 11,369,890 B2
(45) Date of Patent: Jun. 28, 2022

(54) AMUSEMENT PARK ATTRACTIONS, AMUSEMENT KARTS, AND MAGNETIC ASSEMBLIES

(71) Applicant: Brandon Paul, Coeur d'Alene, ID (US)

(72) Inventor: Brandon Paul, Coeur d'Alene, ID (US)

(*) Notice: Subject to any disclaimer, the term of this patent is extended or adjusted under 35 U.S.C. 154(b) by 0 days.

(21) Appl. No.: 17/075,687

(22) Filed: Oct. 20, 2020

(65) Prior Publication Data

US 2021/0031117 A1    Feb. 4, 2021

Related U.S. Application Data

(62) Division of application No. 15/799,888, filed on Oct. 31, 2017, now Pat. No. 10,843,091.

(60) Provisional application No. 62/416,635, filed on Nov. 2, 2016.

(51) Int. Cl.
     *A63H 33/26*      (2006.01)
     *A63G 25/00*      (2006.01)
     *B62D 37/00*      (2006.01)
     *A63H 25/00*      (2006.01)

(52) U.S. Cl.
     CPC .............. *A63G 25/00* (2013.01); *A63H 33/26* (2013.01); *B62D 37/00* (2013.01)

(58) Field of Classification Search
     CPC ...... A63H 17/00; A63H 17/262; A63H 17/02; A63H 17/26; A63H 17/004; A63H 33/046; A63H 33/26
     USPC .................. 446/431, 448–449, 465, 469–470
See application file for complete search history.

(56) References Cited

U.S. PATENT DOCUMENTS

| | | | |
|---|---|---|---|
| 1,668,249 A | 5/1928 | Rich | |
| 3,810,706 A | 5/1974 | Grimm et al. | |
| 4,031,661 A | 6/1977 | Bernhard | |
| 4,429,488 A | 2/1984 | Wessels | |
| 5,188,567 A | 2/1993 | Volkov | |
| 5,295,551 A | 3/1994 | Sukonick | |
| 5,380,231 A * | 1/1995 | Brovelli | A63H 17/002 446/435 |
| 5,474,486 A * | 12/1995 | Chilton | A63H 17/006 222/78 |

(Continued)

FOREIGN PATENT DOCUMENTS

| | | |
|---|---|---|
| DE | 1997657 | 11/1968 |
| EP | 0525657 | 2/1993 |

(Continued)

*Primary Examiner* — Kien T Nguyen
(74) *Attorney, Agent, or Firm* — Wells St. John P.S.

(57) ABSTRACT

Sets of magnet assemblies coupled to the undercarriage of an amusement kart are provided. Each of the magnet assemblies can include: a suspension component coupled to the undercarriage; magnetic material coupled to the suspension component; and a rotating component coupled to the suspension component. Other sets of magnet assemblies can include a skid component coupled to the suspension component. Amusement park attractions are provided that can include: an amusement kart having one or more magnet assemblies coupled to an undercarriage of the amusement kart; and a track comprising iron plating sufficient to magnetically engage the one or more magnet assemblies. Amusement karts are also provided that can include: a frame supported by front and rear wheels; and complimentary side rails extending along both sides of the frame and between the front and rear wheels.

7 Claims, 21 Drawing Sheets

(56) References Cited

U.S. PATENT DOCUMENTS

| | | | |
|---|---|---|---|
| 5,710,565 A | 1/1998 | Shirai et al. | |
| 5,901,806 A | 5/1999 | Takahashi | |
| 6,244,968 B1 | 6/2001 | Arie | |
| 6,422,151 B2 | 7/2002 | Maleika | |
| 7,059,252 B2 | 6/2006 | Guardo, Jr. | |
| 7,389,730 B2 | 6/2008 | Reuter | |
| 7,722,427 B2 * | 5/2010 | Yamana | A63H 18/16 446/133 |
| 7,749,047 B2 * | 7/2010 | Dunham | A63H 17/004 446/470 |
| 7,950,333 B2 | 5/2011 | Crawford et al. | |
| 8,634,980 B1 | 1/2014 | Urmson et al. | |
| 9,814,996 B2 * | 11/2017 | Janson | A63H 17/262 |
| 2005/0216167 A1 | 9/2005 | Nozawa et al. | |
| 2007/0204759 A1 | 9/2007 | Hunter | |
| 2011/0223829 A1 | 9/2011 | Sheltman | |
| 2011/0294391 A1 * | 12/2011 | Todd | A63H 18/14 446/129 |
| 2013/0340529 A1 | 12/2013 | Lama | |
| 2014/0230711 A1 | 8/2014 | Lovelace et al. | |

FOREIGN PATENT DOCUMENTS

| | | |
|---|---|---|
| FR | 2826917 | 1/2003 |
| GB | 1493343 | 11/1977 |
| JP | H 11276718 | 10/1999 |
| JP | 3374183 | 2/2003 |
| JP | 2004135690 | 5/2004 |

* cited by examiner

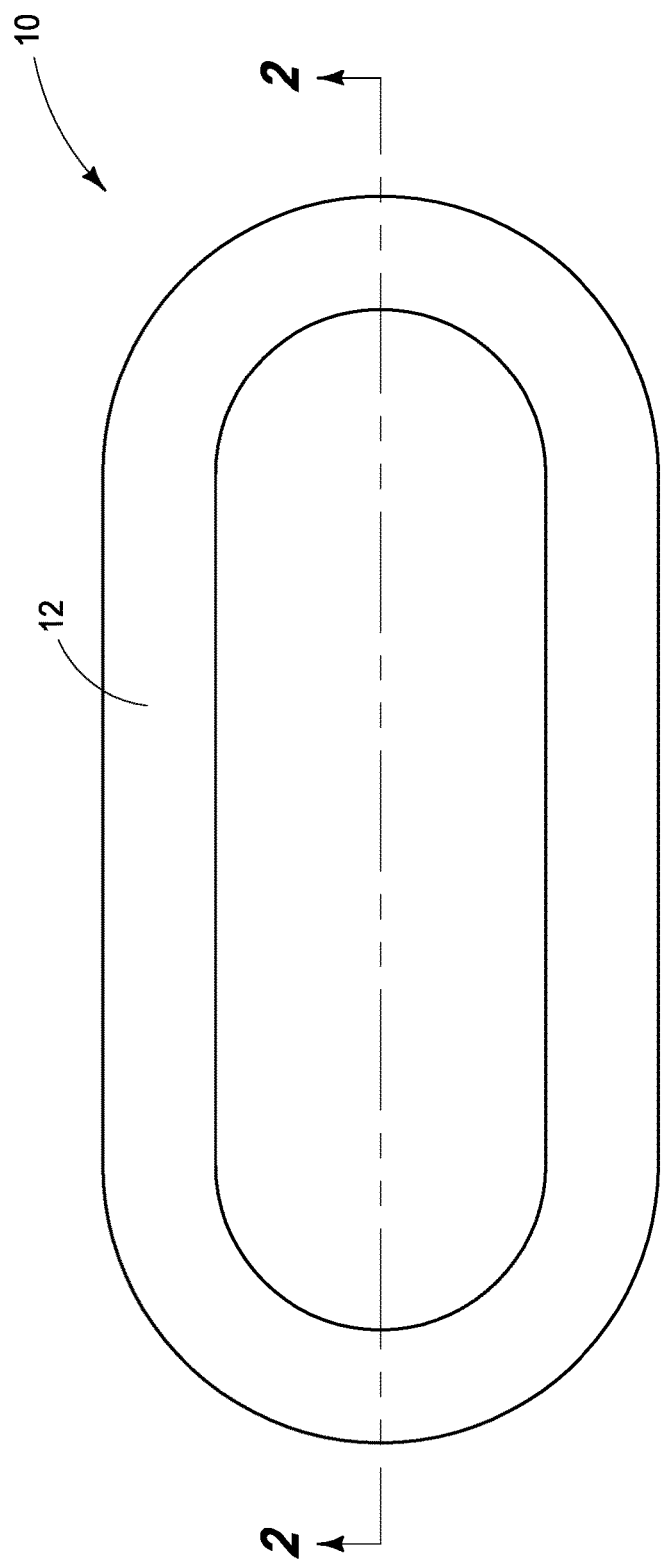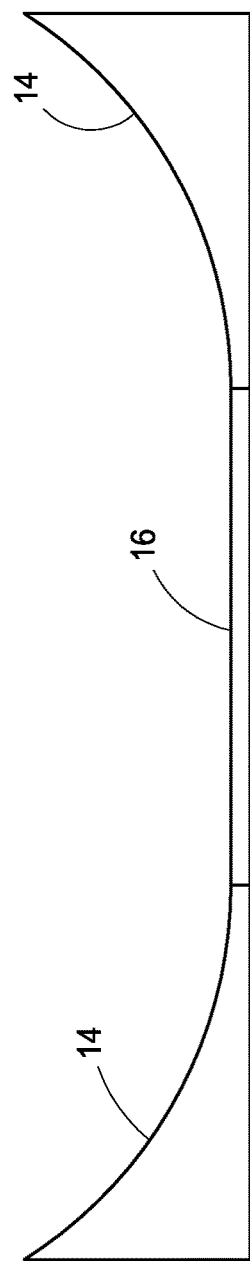

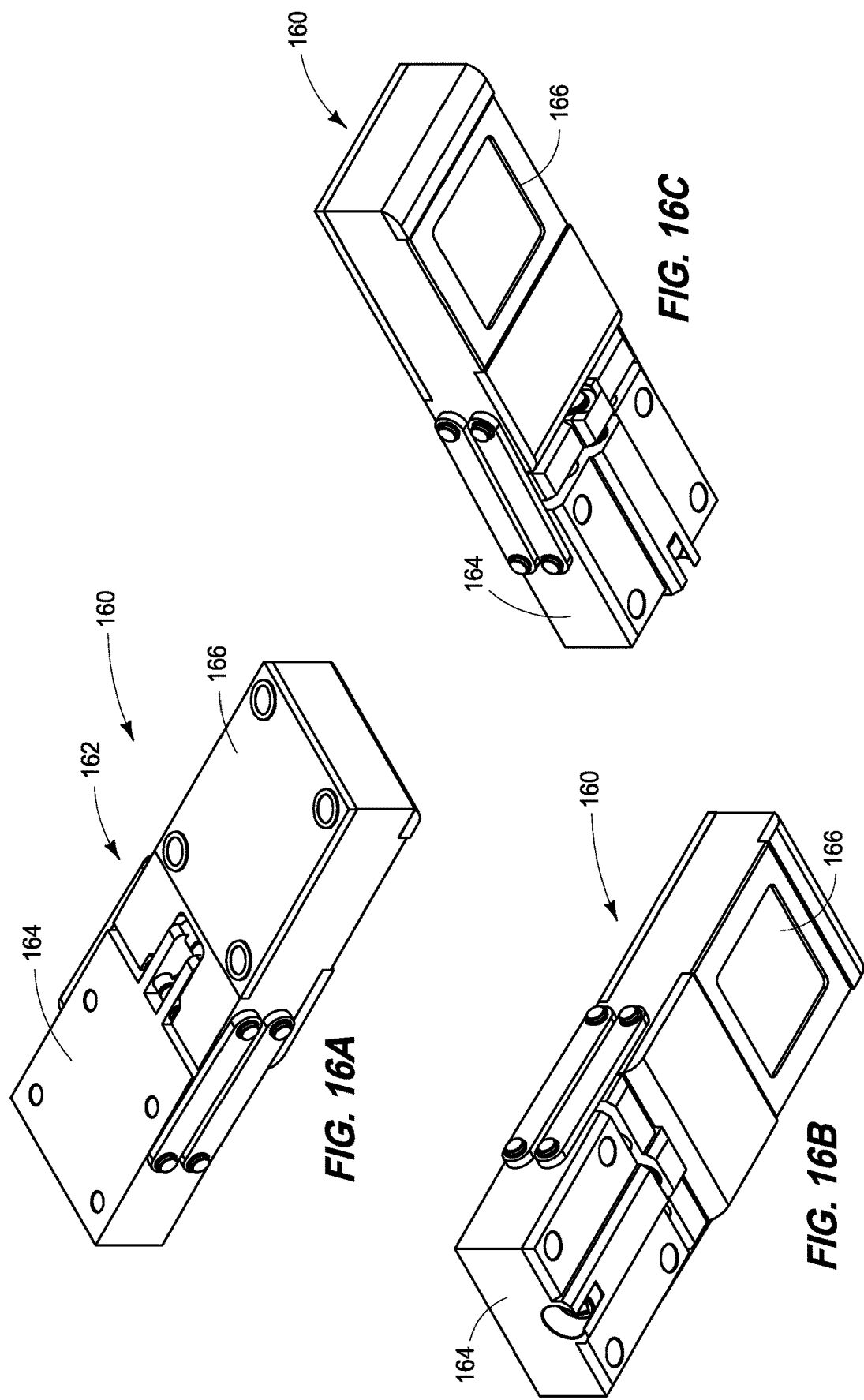

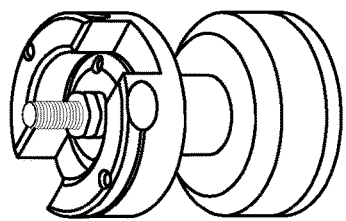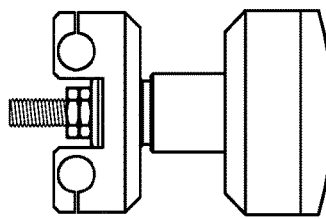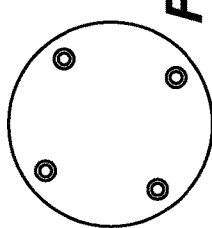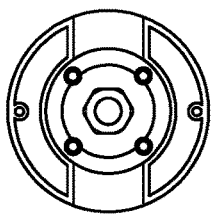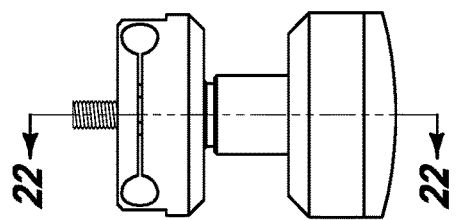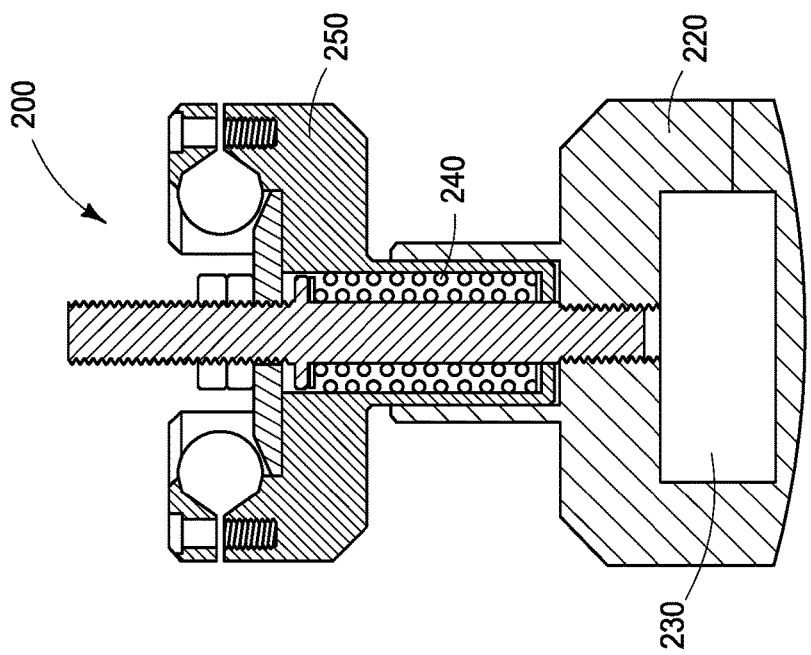

AMUSEMENT PARK ATTRACTIONS, AMUSEMENT KARTS, AND MAGNETIC ASSEMBLIES

CROSS REFERENCE TO RELATED APPLICATION

This application is a divisional of U.S. patent application Ser. No. 15/799,888 filed Oct. 31, 2017, entitled "Amusement Park Attractions, Amusement Karts, and Magnetic Assemblies", which claims priority to and the benefit of U.S. provisional patent application Ser. No. 62/416,635 which was filed Nov. 2, 2016, entitled "Amusement Vehicle Components and Amusement Rides", the entirety of each of which is incorporated by reference herein.

TECHNICAL FIELD

The field of the invention is amusement vehicles and amusement rides, particularly amusement rides that utilize magnets to secure vehicles to tracks and amusement rides that utilize magnet assemblies of amusement vehicles and ferro-magnetic tracks.

BACKGROUND

For decades, there has been a need to provide more and more exciting amusement rides for park visitors around the nation and the globe. These rides often times include steerable vehicles such as the classic go-kart ride or the bumper car ride, for that matter. The present disclosure provides amusement vehicles and rides that utilize magnetized components.

DRAWINGS

Embodiments of the disclosure are described below with reference to the following accompanying drawings.

FIG. 1 is a portion of an amusement ride according to an embodiment of the disclosure.

FIG. 2 is a cross section of the amusement ride of FIG. 1 according to an embodiment of the disclosure.

FIGS. 16A-16C are views of a magnetic assembly of an amusement ride vehicle according to an embodiment of the disclosure.

FIGS. 22-27 are views of a magnetic assembly according to an embodiment of the disclosure.

SUMMARY

Sets of magnet assemblies coupled to the undercarriage of an amusement kart are provided. Each of the magnet assemblies can include: a suspension component coupled to the undercarriage; magnetic material coupled to the suspension component; and a rotating component coupled to the suspension component. Other sets of magnet assemblies can include: a suspension component coupled to the undercarriage; magnetic material coupled to the suspension component; and a skid component coupled to the suspension component.

Amusement park attractions are provided that can include: an amusement kart having one or more magnet assemblies coupled to an undercarriage of the amusement kart; and a track comprising iron plating sufficient to magnetically engage the one or more magnet assemblies.

Amusement karts are also provided that can include: a frame supported by front and rear wheels; and complimentary side rails extending along both sides of the frame and between the front and rear wheels.

DESCRIPTION

This disclosure is submitted in furtherance of the constitutional purposes of the U.S. Patent Laws "to promote the progress of science and useful arts" (Article 1, Section 8).

The vehicles and rides of the present disclosure will now be described with reference to FIGS. 1-28. Referring first to FIG. 1, a classic kart track 10 is shown that includes track 12. As shown in FIG. 2, the track can include banked edges 14 and flat portion 16. Flat portion 16 can be constructed of a non-magnetic material, while banked edges 14 can be constructed of a magnetic material. Track 12 may have iron plating sufficient to magnetically engage one or more magnets associated with an amusement kart. The amusement kart is sufficient in size and/or shape to seat and carry one or more persons.

Figure 3:
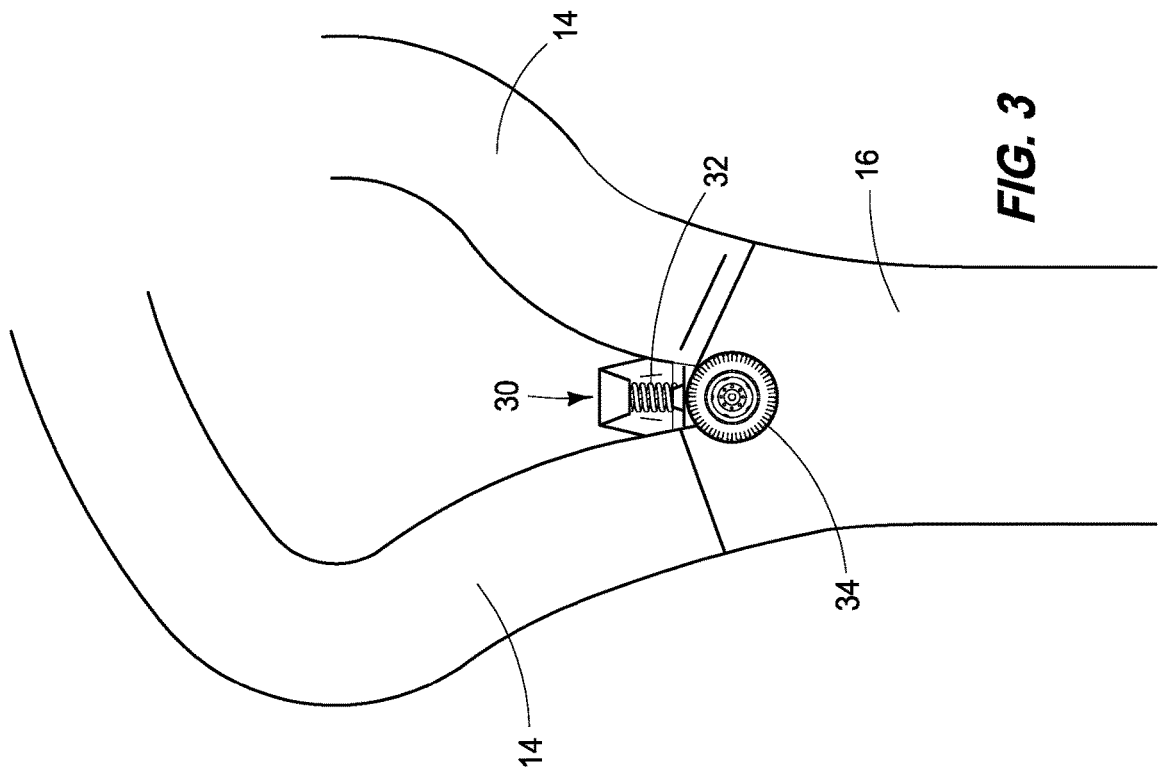
FIG. 3 is a top view of an amusement ride according to an embodiment of the disclosure.
Figure 6A:
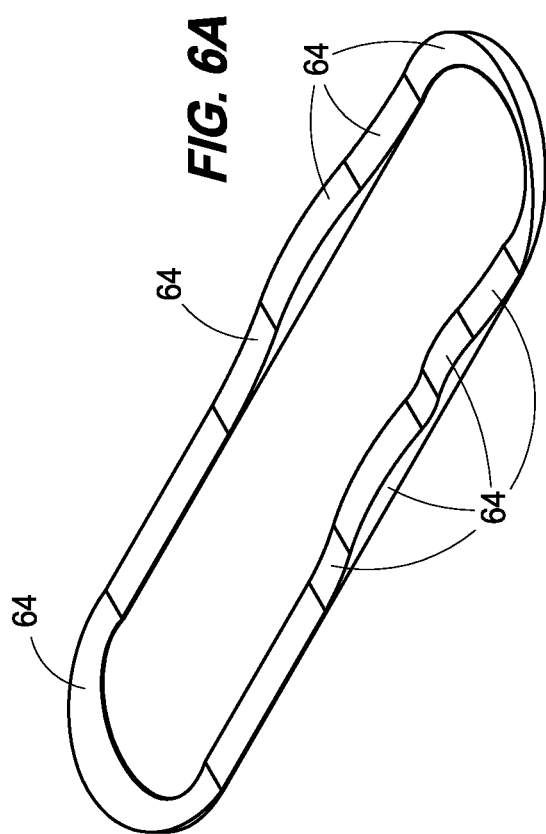
FIGS. 6A-6D are views of a portion of an amusement ride according to an embodiment of the disclosure.
Figure 6B:
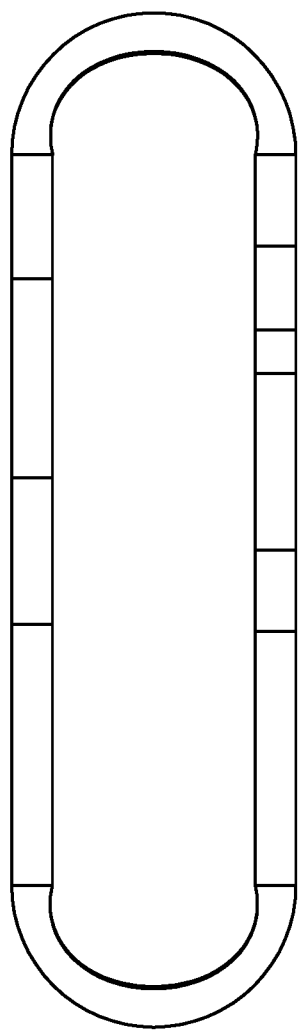
Figure 6C:
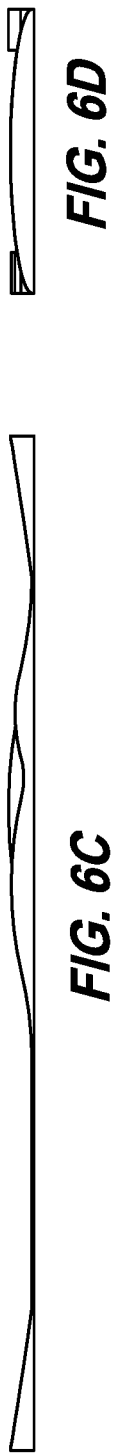
Figure 6D:

Referring next to FIG. 3, according to an example implementation, an amusement ride track can include metal portions 14 as well as wood portion 16. Separating two metal portions 14 can be a gate keeper assembly or dividing mechanism 30 that includes a roller 34 that is connected to a spring mechanism 32. According to example implementations, this mechanism can be used in combination with a magnetization of track 14 to allow access to either one or both of tracks 14.

Figure 2A:
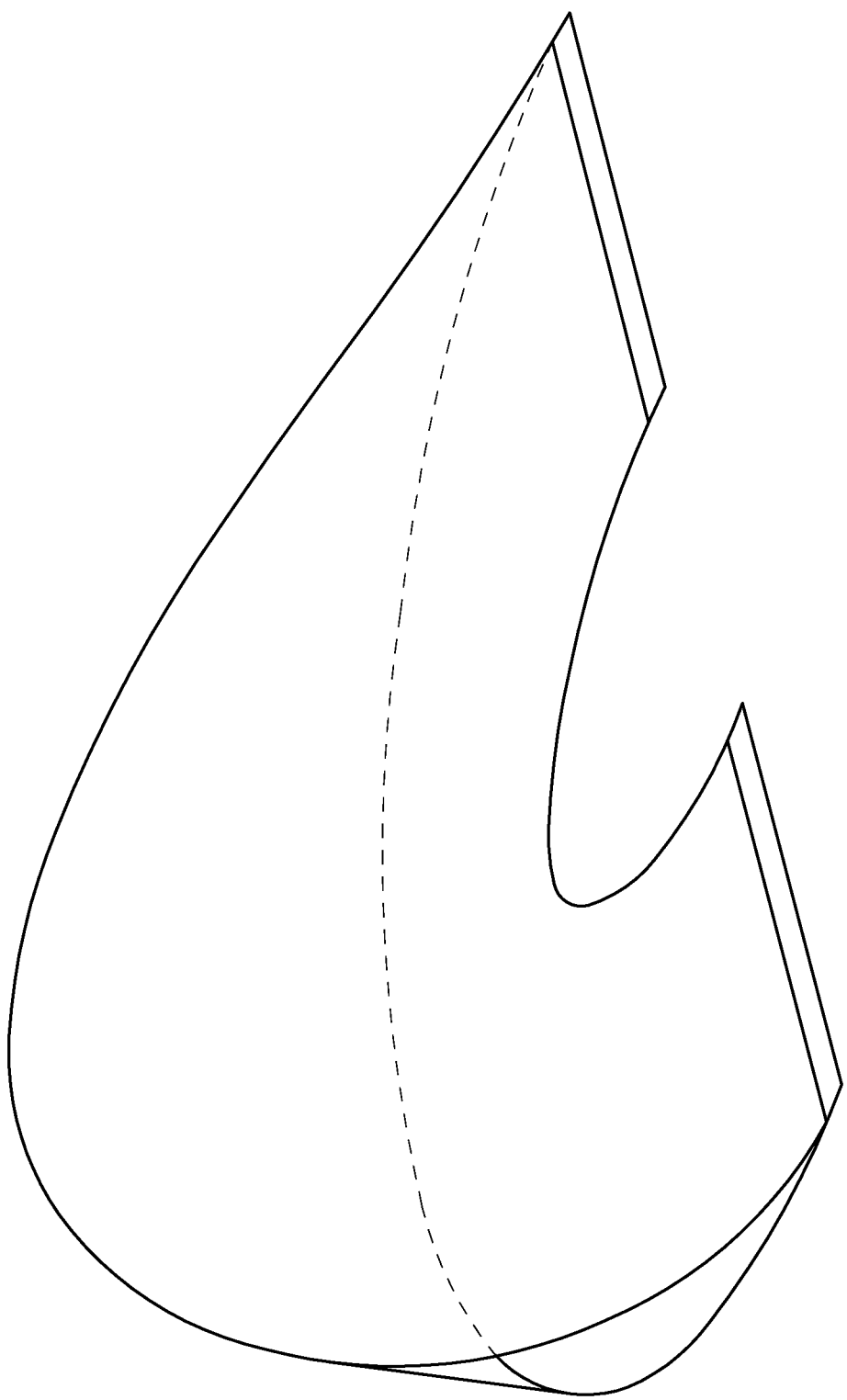
FIG. 2A is a perspective view of a portion of the amusement ride of FIG. 1 according to an embodiment of the disclosure.
Figure 4:
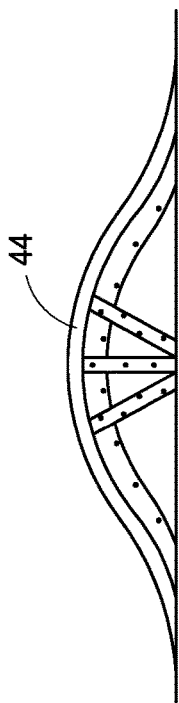
FIG. 4 is a portion of an amusement ride according to an embodiment of the disclosure.
Figure 5:
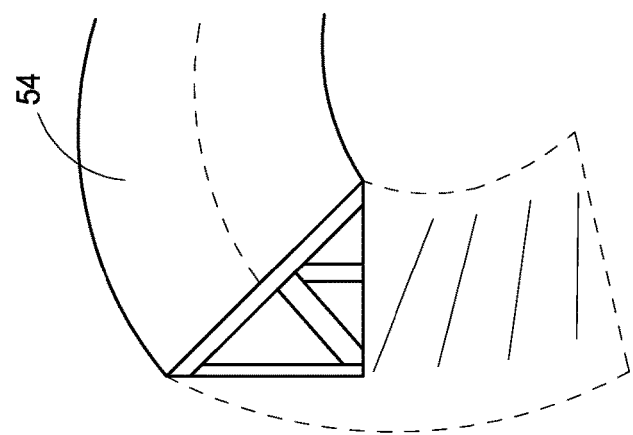
FIG. 5 is a portion of an amusement ride according to an embodiment of the disclosure.

Referring next to FIGS. 4 and 5, portions 44 can be metallic in a hill portion of a track as shown in FIG. 4 and/or a banked portion 54 of a track as shown in FIG. 5. Referring next to FIGS. 6A-6D, a depiction of a complete track with hills and banked portions is shown, with the metal portion 64 represented at banks, upturns, downturns, and hill portions of the depicted track. In accordance with example implementations, track 12 can include linear and non-linear portions. The linear portions can be constructed of non-metallic materials while the non-linear portions can be constructed of metallic and/or ferro-magnetic materials. For example, the non-linear portion can include iron plating and the linear portion can include wood. Non-linear portions of the track can define a ramp, dip, hill, turn, or banked turn as shown in FIG. 2A.

Figure 9:
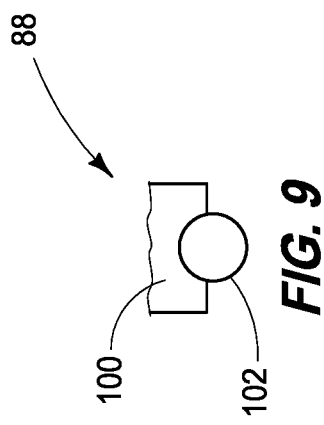
FIG. 9 is a portion of an amusement ride vehicle according to an embodiment of the disclosure.
Figure 7:
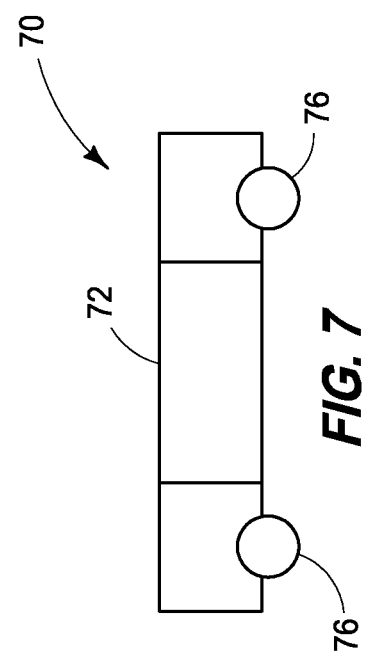
FIG. 7 is an amusement ride vehicle according to an embodiment of the disclosure.
Figure 8:
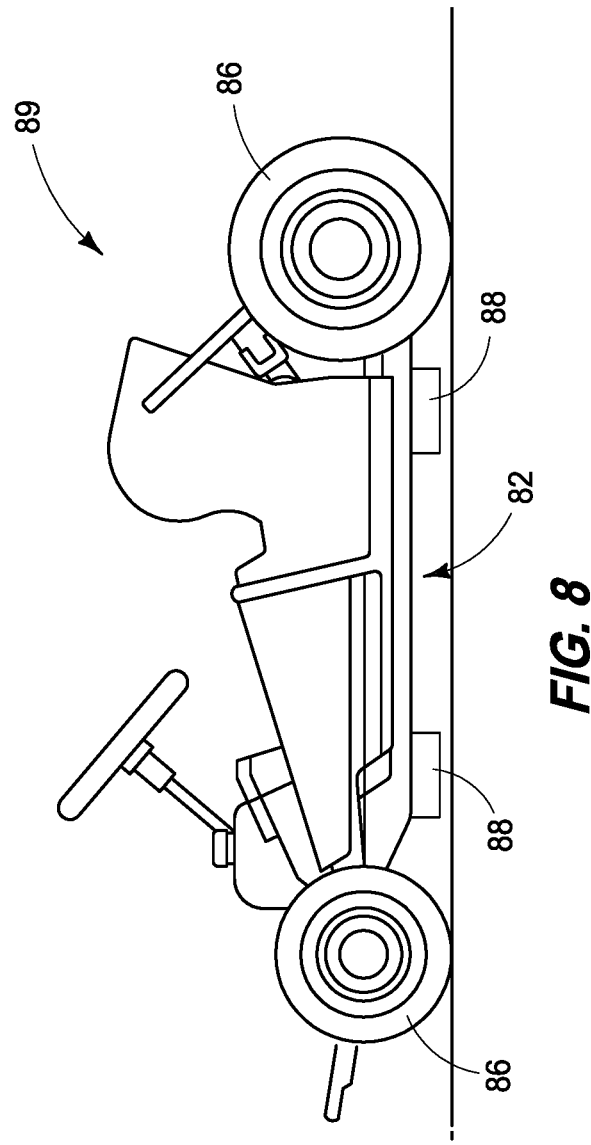
FIG. 8 is another depiction of an amusement ride vehicle according to an embodiment of the disclosure.

Referring next to FIG. 7, an amusement ride vehicle or amusement kart 70 is shown that includes a frame portion 72 supported by wheel portions 76. Referring to FIG. 8, according to another embodiment, amusement ride vehicle 89 is shown that includes a frame portion 82 supported by wheel portions 86 and magnet assemblies 88 coupled to the frame portion 82 at the undercarriage of kart 70. In accordance with example implementations, FIG. 9 represents magnet assembly 88 that includes a substrate 100 as well as a gliding or semi-contact portion 102. Semi-contact portion 102 can be a rolling portion and/or be in combination with a magnetic portion that may be a slide but in typical circumstances the engagement of magnetic portion 102 to a metal portion of a track can be fluid. Substrate 100 can include a suspension component that is coupled to the undercarriage of kart 70. As shown and depicted, the suspension component can include a leaf spring or coil spring.

Figure 10A:
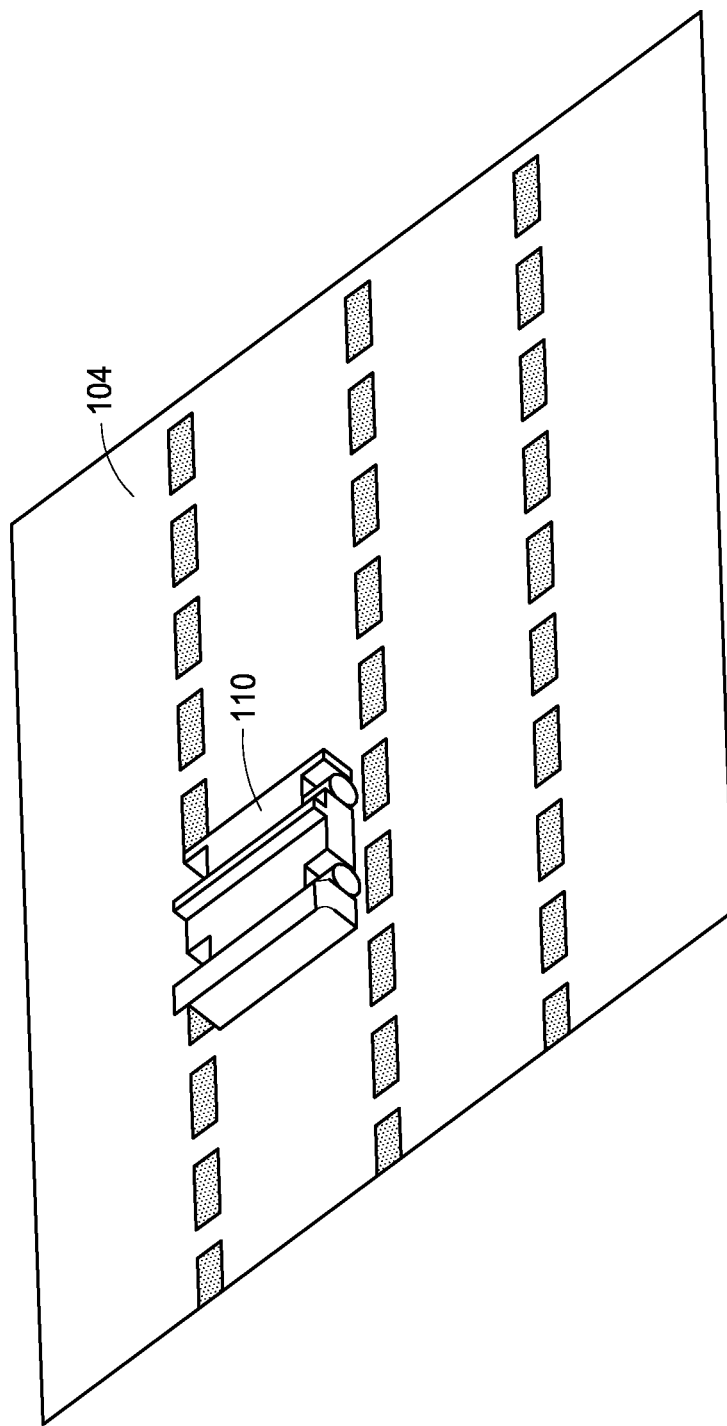
FIGS. 10A and 10B are a view of an amusement ride vehicle on an amusement ride track according to an embodiment of the disclosure and an undercarriage of an amusement ride vehicle according to an embodiment of the disclosure.
Figure 10B:
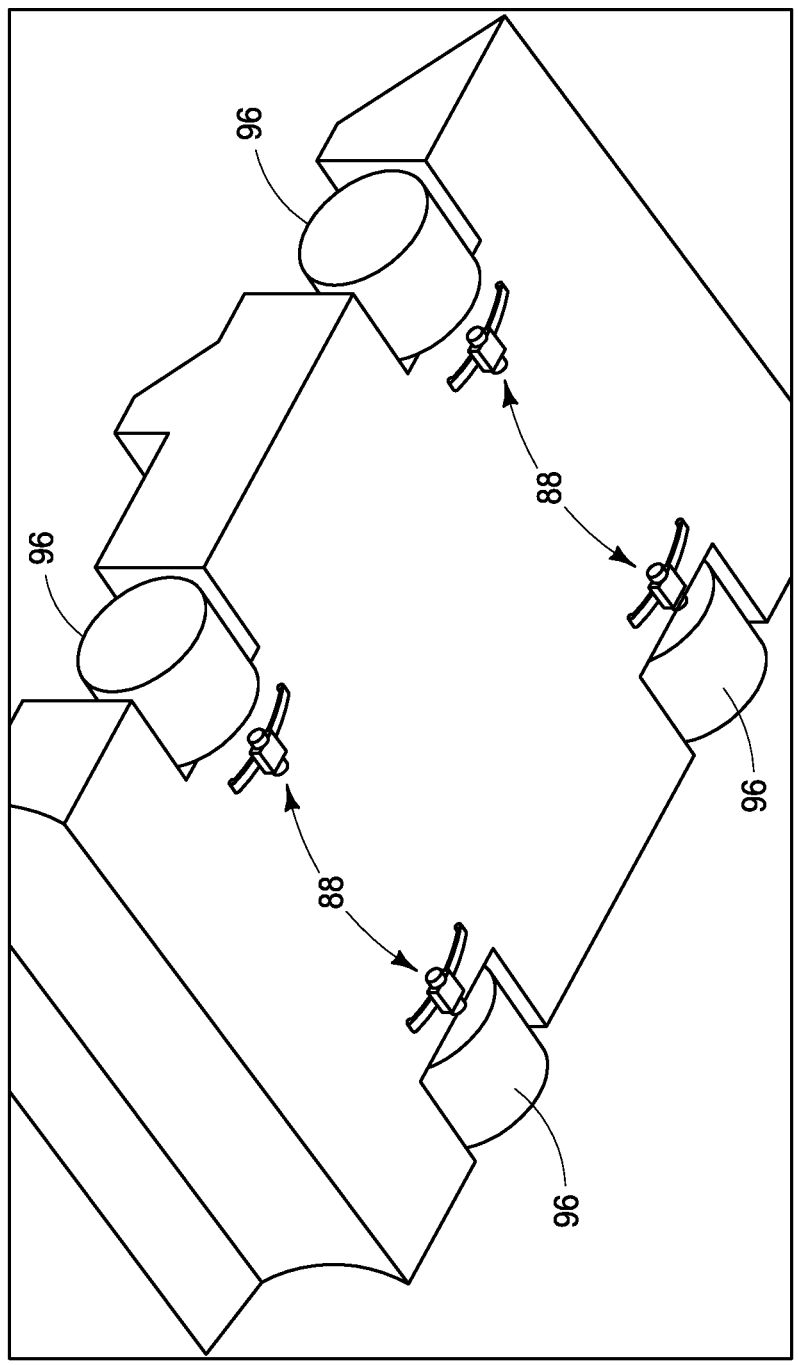

Referring next to FIGS. 10A and 10B, an amusement ride vehicle 110 is shown magnetically and gravitationally affixed to track portion 104. Track portion 104 can be at least partially metallic, and amusement ride vehicle 110 can have magnets affixed thereto that allow for vehicle 110 to remain relatively affixed to track portion 104. In FIG. 10B an undercarriage of an amusement ride vehicle is shown with wheels 96 and magnet assemblies 88 coupled to the frame portion of the amusement ride vehicle.

Figure 11:
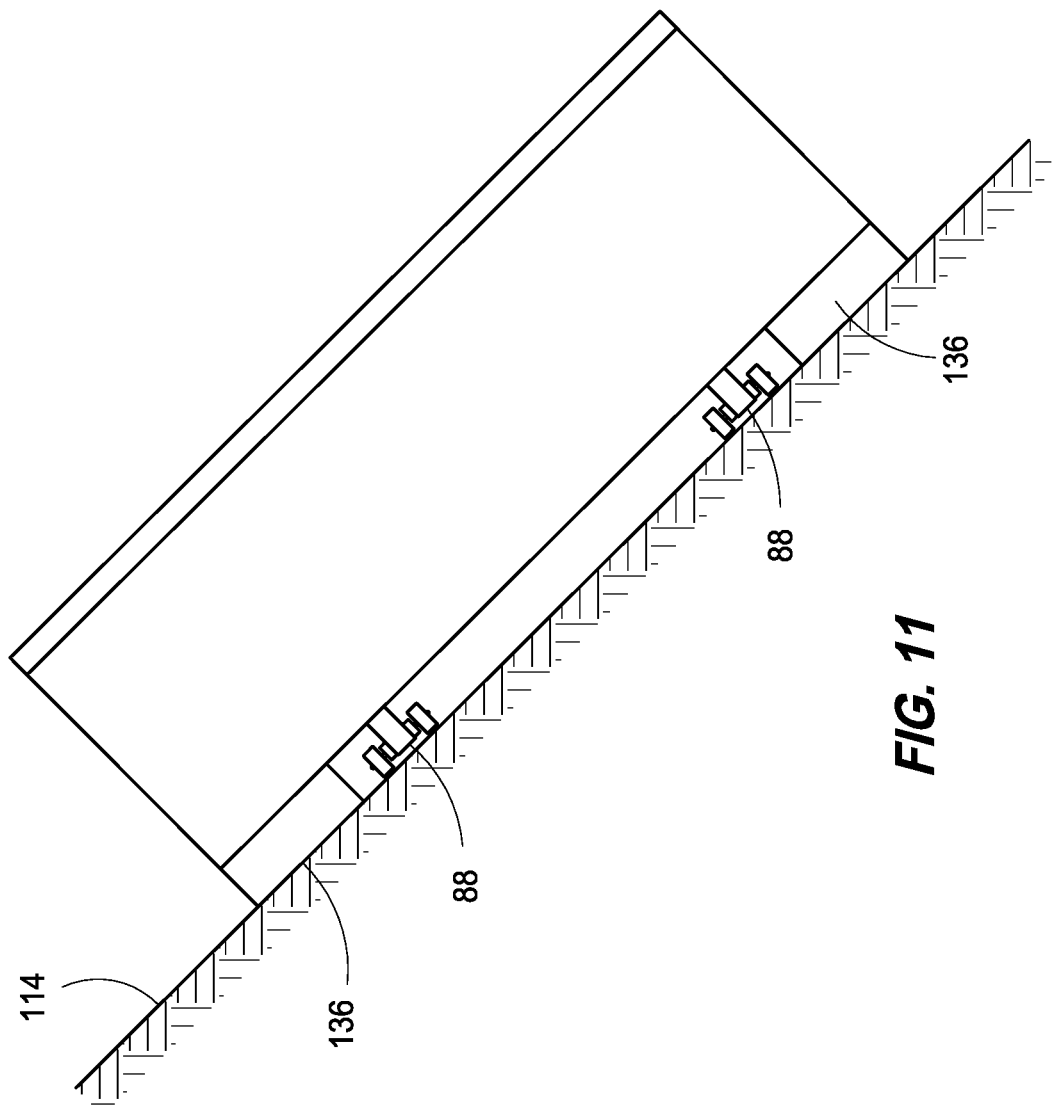
FIG. 11 is a depiction of an amusement ride vehicle on an amusement ride track according to an embodiment of the disclosure.

Referring to FIG. 11, at another angle, metal track portion 114 can support a vehicle having wheels 116 and magnet assemblies 88 at an angle, thus preventing inertial slide in one or both directions over or down through the track.

Figure 12:
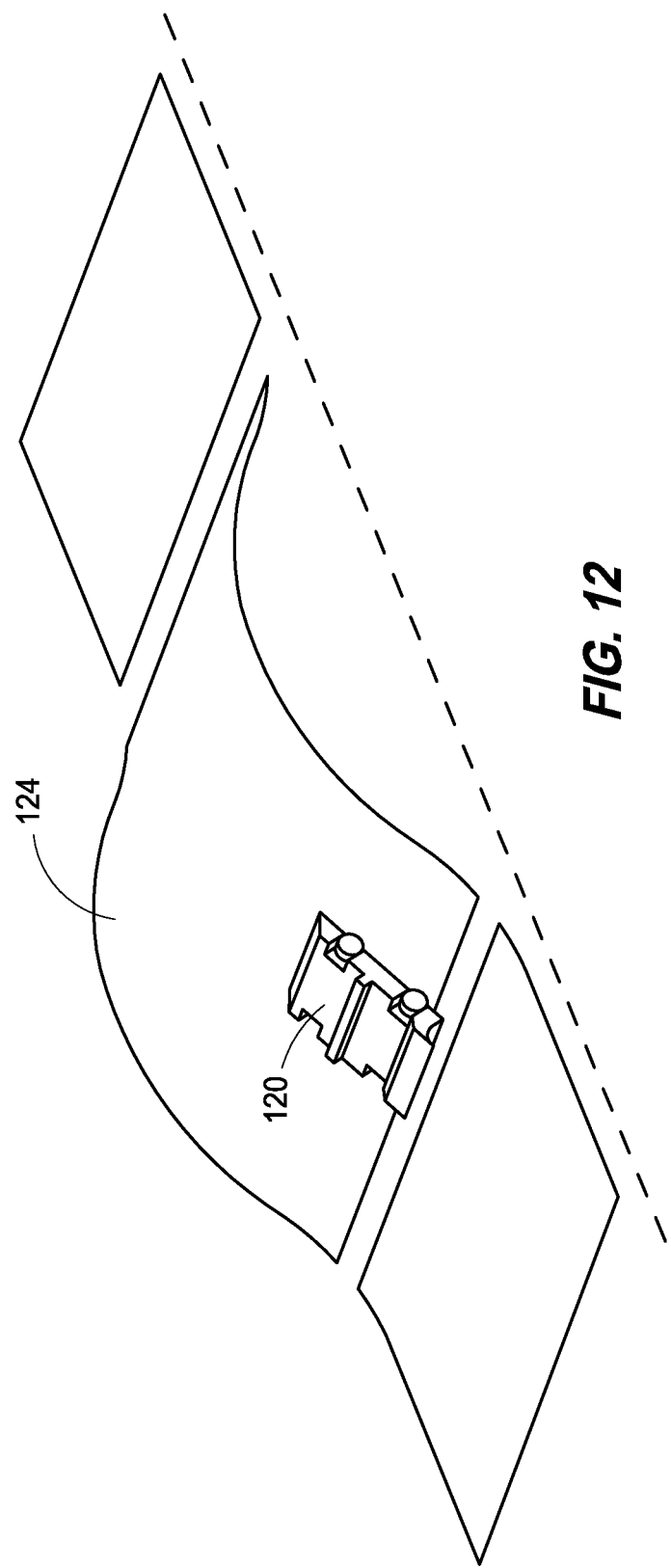
FIG. 12 is an amusement ride vehicle on an amusement ride track according to an embodiment of the disclosure.
Figure 13:
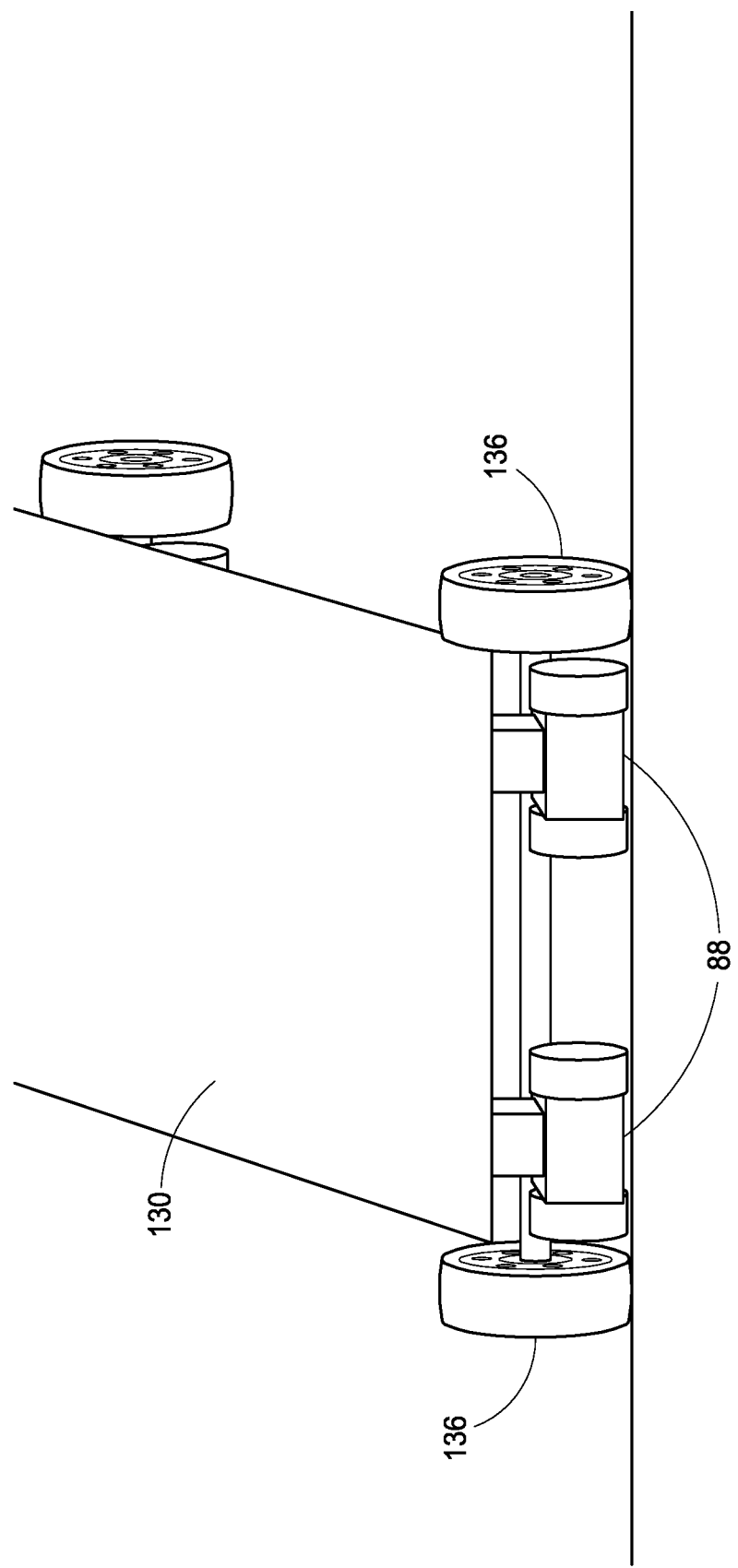
FIG. 13 is an amusement ride vehicle on an amusement ride track according to an embodiment of the disclosure.

Referring next to FIG. 12, metal portion of track 124 is shown with vehicle 120 affixed thereto. Vehicle 120 in association with track 124 can ascend and descend hill portion 124 without becoming less affixed to track 124. In certain circumstances, vehicle 120 can ascend but not lose frictional advantage or become frictionally disadvantaged when descending track hill 124 because of its affixation thereto. Referring to FIG. 13, vehicle 130 can have wheels 136 and magnet assemblies 88 affixing vehicle 132 to track 134, for example.

Figure 14:
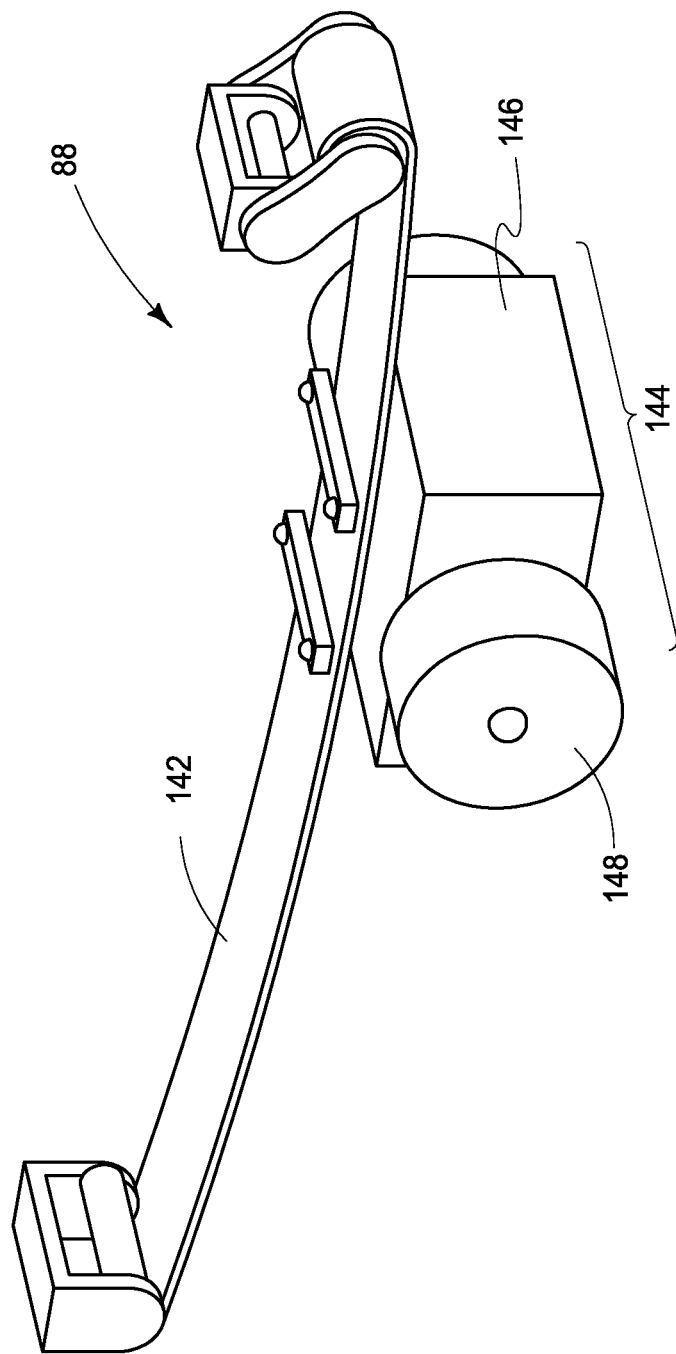
FIG. 14 is a magnetic assembly of an amusement ride vehicle according to an embodiment of the disclosure.

Referring to FIG. 14, according to one example implementation, a magnet assembly 88 can include a rare earth magnet 146 that is buffered from the track by wheel portions or rotating component 148, and this assembly can be biased in relation to a frame by biasing assembly or suspension component 142. In accordance with example implementations, biasing assembly 142 can be a leaf spring design or band spring that allows for the relationship between magnet assembly 144 and the track to be maintained during operation. Magnet assembly 144 can include magnet material being rectangular in at least one cross section.

Figure 15:
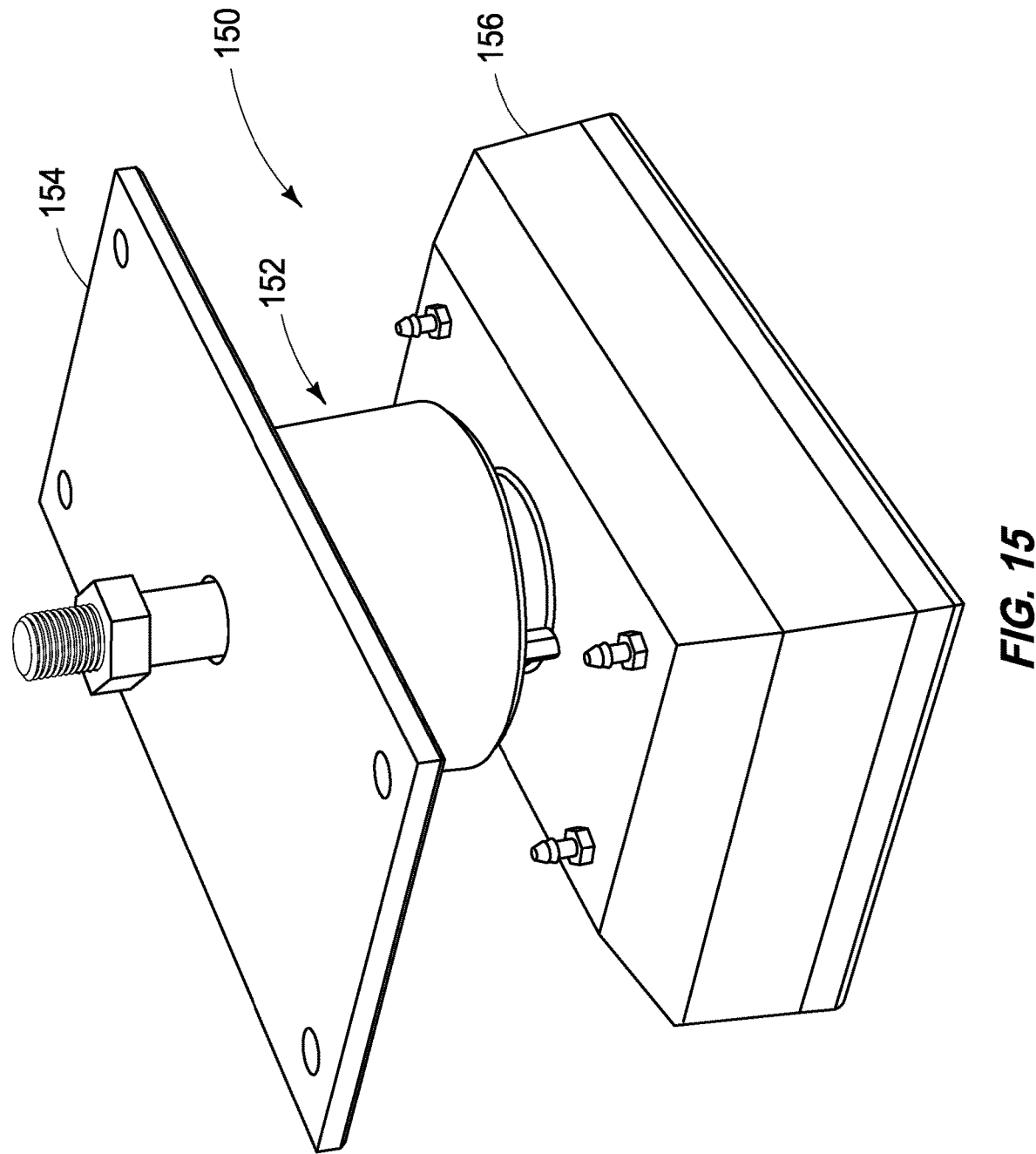
FIG. 15 is magnetic assembly of an amusement ride vehicle according to an embodiment of the disclosure.

Referring to FIG. 15, an example magnet assembly 150 is shown that includes coupling portion 154 coupled to biasing portion or suspension component 152 and magnet portion 156. In accordance with example implementations, the biasing portion can maintain the relationship between the magnet 156 and the frame of the vehicle as coupled thereto at 154. The biasing portion or suspension component can include a coil spring.

Figure 17A:
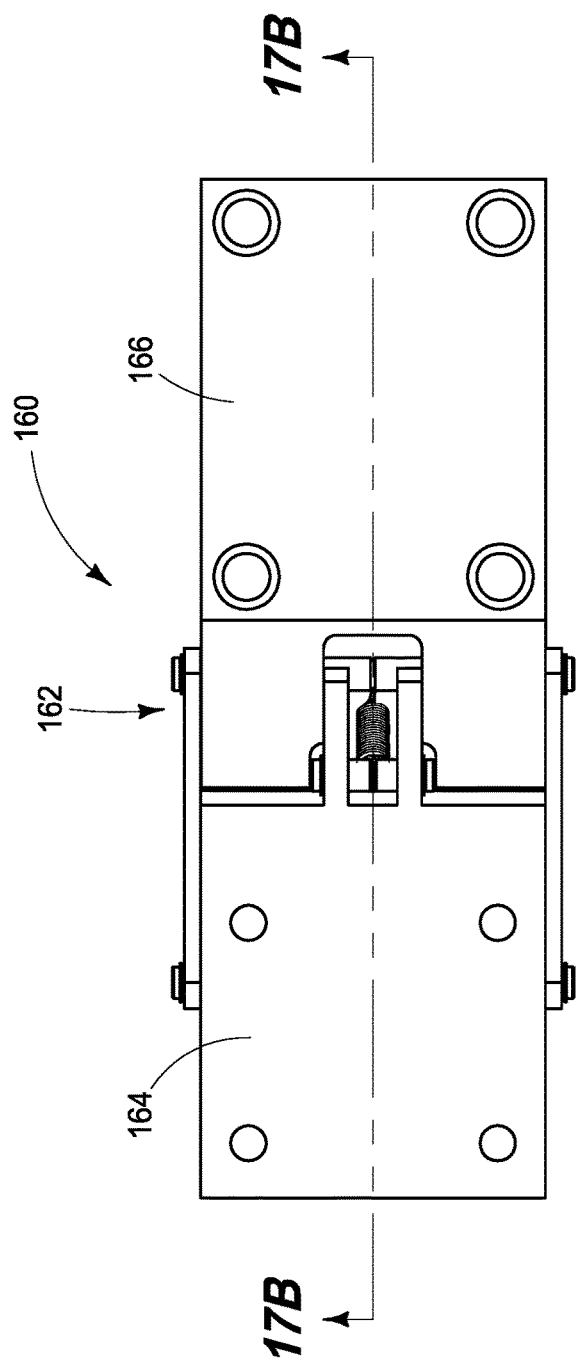
FIGS. 17A-17B are views of the assembly of 16A-16C according to an embodiment of the disclosure.
Figure 17B:
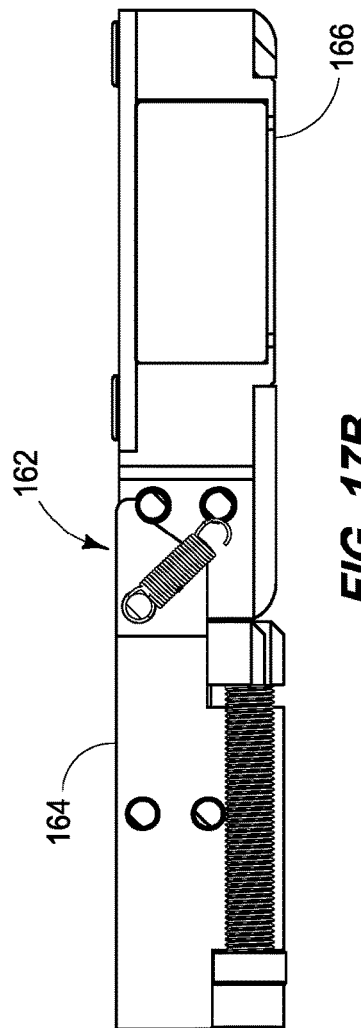

Referring next to FIGS. 16A-16C, another example magnet assembly 160 is shown that includes a biasing section or suspension component 162 that couples mounting section 164 to magnet section 166. In FIGS. 17A-17B, further depictions of magnet assembly 160 are shown that depict spring and lever components of assembly 160.

Figure 18B:
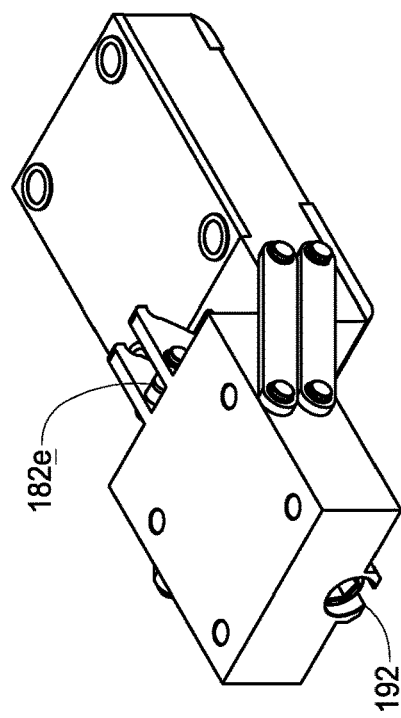
FIGS. 18A-18C are views of the assembly of FIGS. 16A-16C and 17A-17B according to an embodiment of the disclosure.
Figure 18A:
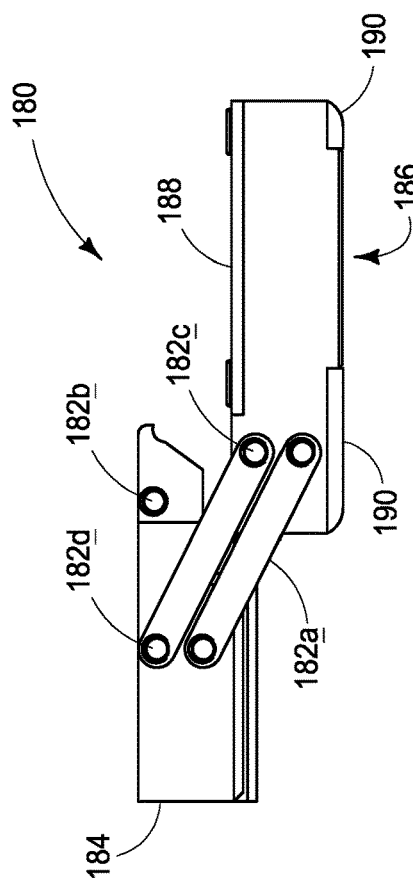
Figure 18C:
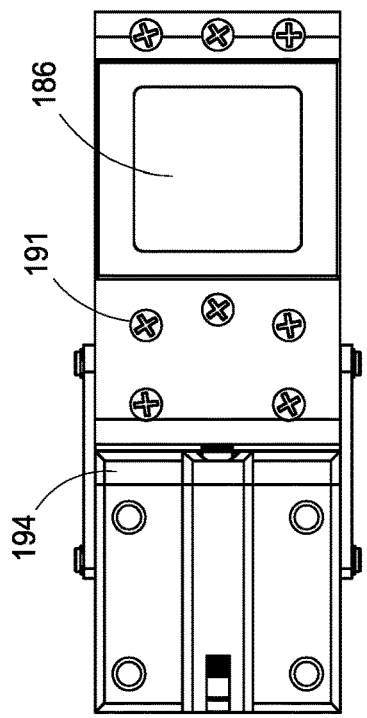
Figure 19A:
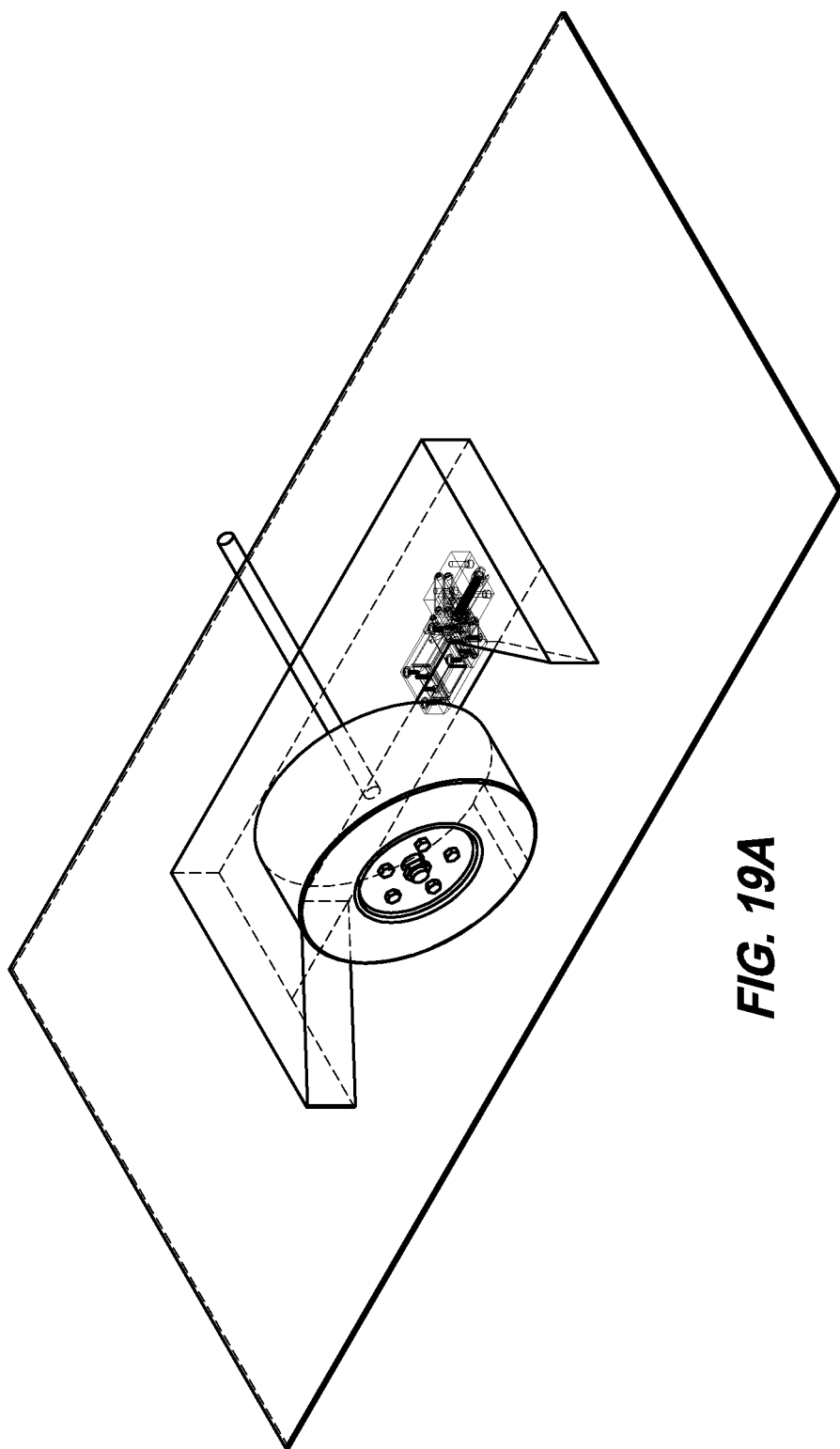
FIGS. 19A-19E are depictions of a portion of an amusement ride vehicle according to an embodiment of the disclosure and pursuant to multiple views.
Figure 19C:
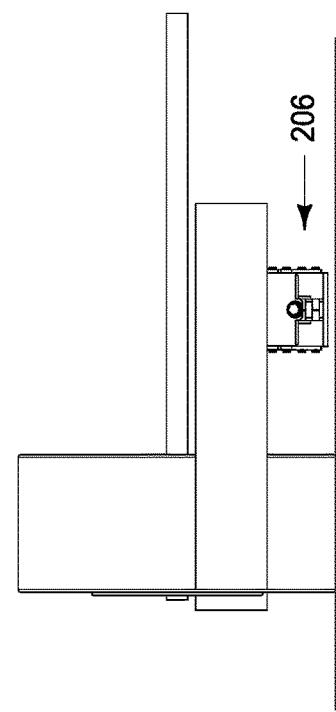
Figure 19E:
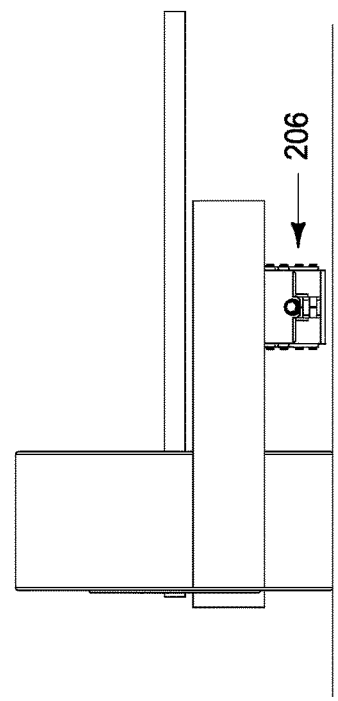
Figure 19B:
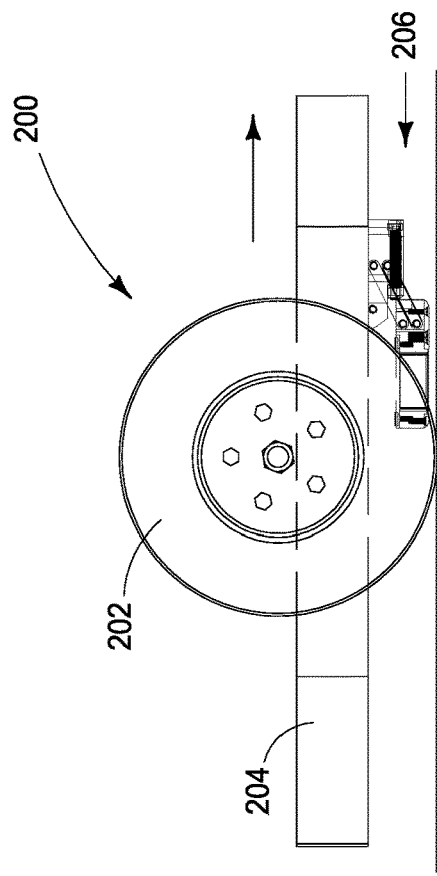
Figure 19D:
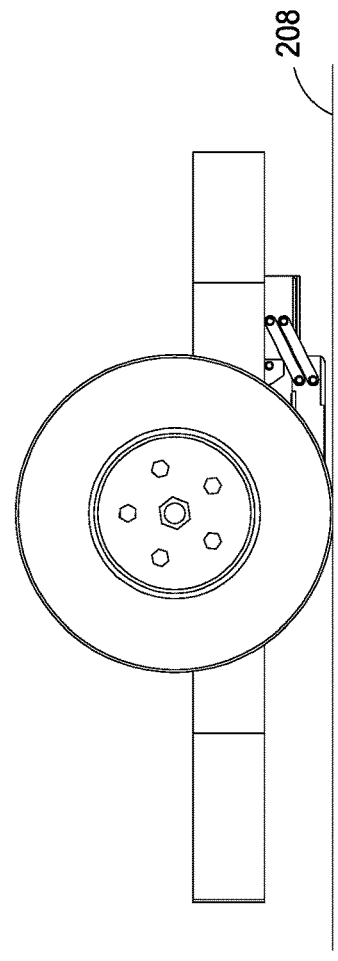
Figure 20:
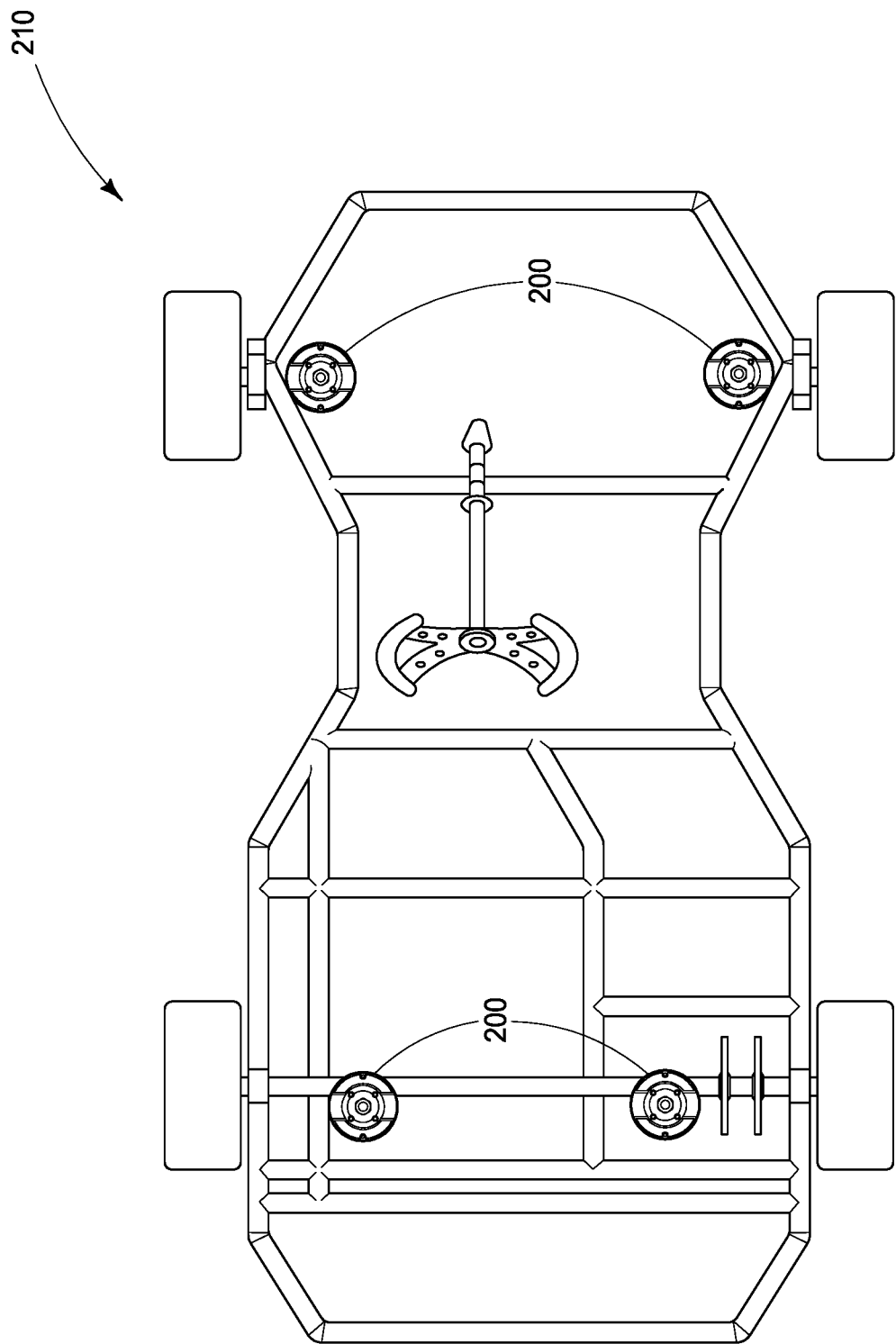
FIG. 20 is a top view of an amusement kart according to an embodiment of the disclosure.
Figure 21:
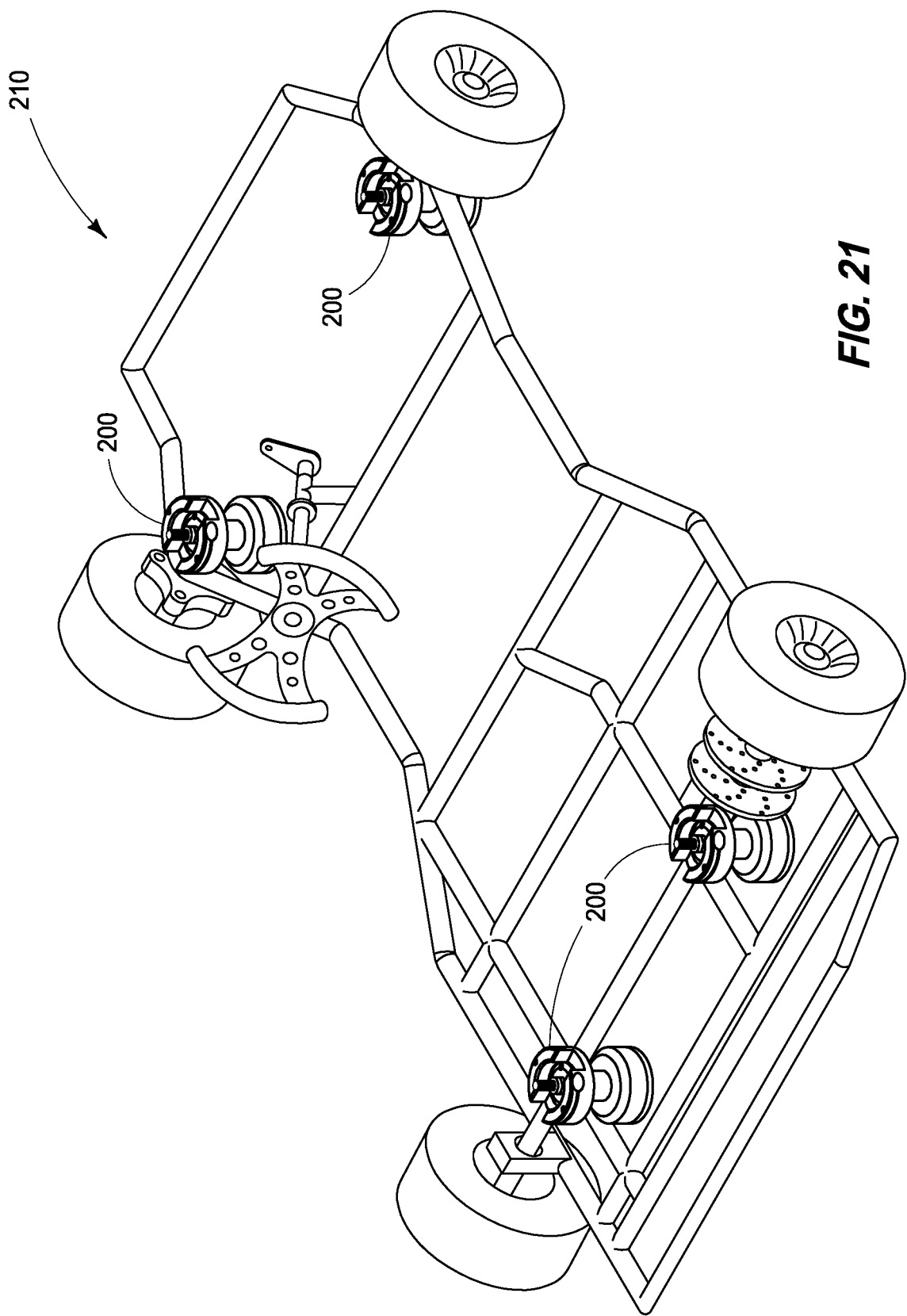
FIG. 21 is a perspective view of the amusement kart of FIG. 20 according to an embodiment of the disclosure.

Referring next to FIGS. 18A-18C, magnet assembly 180 is shown in an extended configuration with a biasing section that includes components 182a-182e. These components can be the pivot arms 182a, the spring pivot pin 182b, the E-clips 182c, the pivot pins 182d, and the retracting spring 182e. In accordance with example implementations, assembly 180 can also include the magnetic over-plate 188 as well as rare earth magnet 186, plastic skid plate 190, and adjustment screw 192 as well as stop plate slide pins 194, and magnet mounting block 184 in combination with magnetic block 186.

Referring next to FIG. 19A-19E, various arrangements of components of magnetic assembly 206 is shown in relation to wheel 202 and frame 204. In accordance with example implementations, a relationship of component 206 is shown with mounting block in the forward direction of the direction that the amusement ride will typically run and magnetic block trailing behind. As can be seen, the magnetic block engages a metal track 208. In accordance with example implementations, the amusement park ride system can include a conduction free track comprising at least some ferro-magnetic portions, and a passenger car comprising a frame, wheels about the frame, a drive train operatively coupled to at least one of the wheels, steering operatively coupled to at least one of the wheels, at least one magnetic device between opposing wheels of the car and associated with the frame and configured to engage the ferro-magnetic portions of the conduction free track.

In accordance with example implementations, the components of assemblies 160 and 180, for example can be pivotably coupled via hinge assembly that in includes at least one arm pivotably connecting the components. This hinge assembly can extend between a skid component that houses the magnetic material and a suspension component that is affixed to the undercarriage of the kart. As shown, the components can be biased or suspended using a coil spring.

Referring to FIGS. 20-27 another magnet assembly 200 as part of amusement kart 210 is shown and detailed. As can be seen kart 210 includes four wheels and an axle associated with the rear wheels while the front wheels are independent. This is not necessary as the wheels may all be independent or they may be mechanically associated via an axle. In accordance with example implementations, kart 210 has magnet assemblies associated with each wheel.

Referring to FIGS. 22-27 more detailed views of magnet assembly 200 are shown. As depicted in FIG. 22 a cross section of assembly 200 is provided that includes skid component 220 housing magnetic material 230. Skid component 220 is suspended via a coil spring 240 from mounting portion 250 which is affixed to the undercarriage of the kart. In accordance with example implementations, magnetic material 230 can be circular in at least one cross section.

Figure 28:
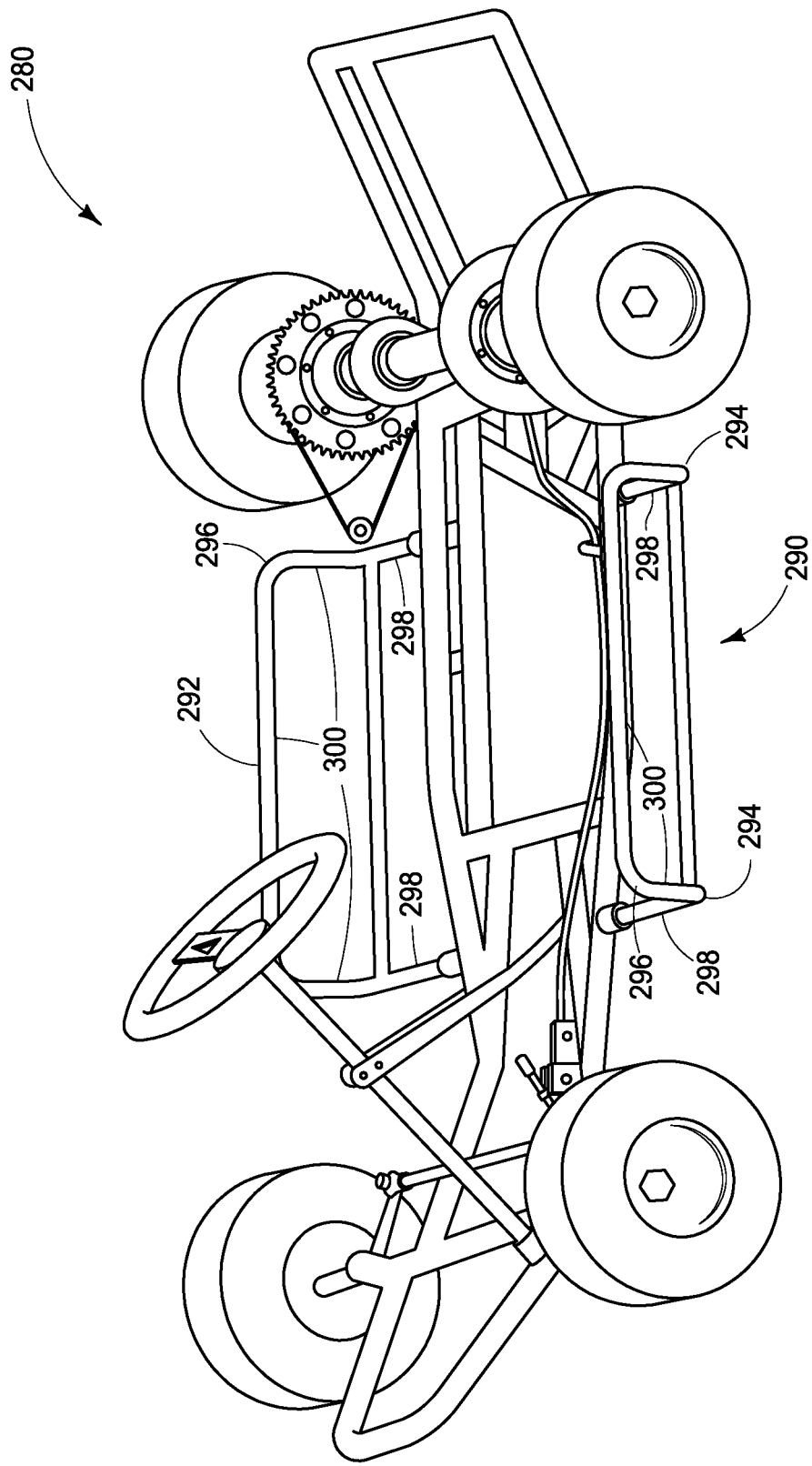
FIG. 28 is a perspective view of an amusement kart according to an embodiment of the disclosure.

Referring next to FIG. 28, an amusement kart 280 is provided that includes: side rails 290; a frame supported by front and rear wheels; and complimentary side rails extending along both sides of the frame and between the front and rear wheels. In accordance with example implementations, the wheels of the kart define a first perimeter of the kart and at least a portion of each of the side rails extend outside the first perimeter. Each of the side rails can be a single member 292 and the single member may be defined four bends, two complimentary bends 294, and two complimentary bends 296. Side rail 290 can include two complimentary portions 298 extending normally from the frame. Side rail 290 can also include a U-span 300 extending between the two complimentary members. U-span 300 can extend normally from each of the two complimentary members.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect.

The invention claimed is:

1. An amusement kart comprising:
   an open amusement kart vehicle frame supported by front and rear wheels operably engaged to matriculate the amusement kart vehicle about an amusement kart vehicle track comprising at least some portions of magnetic material;
   a steering mechanism operably associated with at least some of the wheels;
   a passenger seat supported by the frame and operably engaged with a passenger restraint system;
   a set of magnet assemblies, each magnetic assembly individually associated with an individual wheel and operably coupled to the frame via a suspension component;
   magnetic material coupled to the suspension component; and
   complimentary side rails extending along both sides of the frame and between the front and rear wheels.

2. The amusement kart of claim 1 wherein the wheels of the kart define a first perimeter of the kart and at least a portion of each of the side rails extend outside the first perimeter.

3. The amusement kart of claim 1 wherein each of the side rails is a single member.

4. The amusement kart of claim 3 wherein the single member comprises four bends.

5. The amusement kart of claim 3 wherein the single member comprises two complimentary portions extending normally from the frame.

6. The amusement kart of claim 5 wherein the single member further comprises a U-span extending between the two complimentary members.

7. The amusement kart of claim 6 wherein the U-span extends normally from each of the two complimentary members.

* * * * *